United States Patent [19]

Kubo

[11] Patent Number: 5,051,128

[45] Date of Patent: Sep. 24, 1991

[54] ELUTION PROCESS FOR GOLD-IODINE COMPLEX FROM ION-EXCHANGE RESINS

[75] Inventor: Susumu Kubo, Sapporo, Japan

[73] Assignees: Nippon Mining Co., Tokyo, Japan; In-Situ, Inc., Laramic, Wyo.

[21] Appl. No.: 515,497

[22] Filed: May 1, 1990

[51] Int. Cl.$^5$ ............................................. C22B 11/04
[52] U.S. Cl. ...................................... 75/712; 75/736; 75/737
[58] Field of Search ......................... 75/736, 737, 712

[56] References Cited

U.S. PATENT DOCUMENTS 2,304,823  12/1942  Harrison .................................. 75/118
3,957,505   5/1976  Homick .................................... 75/108
4,557,759  12/1985  McGrew ................................... 75/712
4,723,998   2/1988  O'Neil ...................................... 75/736
4,734,171   3/1988  Murphy .................................. 204/111

Primary Examiner—Peter D. Rosenberg
Attorney, Agent, or Firm—Sheridan, Ross & McIntosh

[57] ABSTRACT

A process for eluting gold-iodine complex from an ion-exchange resin, characterized by adding sulfuric acid and sodium nitrite to the gold-iodine complex adsorbed on the resin, and adding sodium sulfite as an eluant. The process is particularly useful for eluting gold-iodine complex adsorbed on strongly basic anion-exchange resin, such as washings resulting from the washing of leach residue which has been passed through the resin.

15 Claims, 1 Drawing Sheet

ELUTION PROCESS FOR GOLD-IODINE COMPLEX FROM ION-EXCHANGE RESINS

FIELD OF THE INVENTION

This invention relates to a process for eluting a gold-iodine complex from a strongly basic anion-exchange resin on which the complex is adsorbed. More particularly, the invention relates to a process for recovering a gold-iodine complex by adsorption with a strongly basic anion-exchange resin from a wash solution containing a low concentration of gold-iodine complex that results from iodine-aided leaching of gold from a gold-containing material, and thereafter eluting the complex from the resin.

The invention is useful for the washing system associated with a lixivial process using an iodine/iodide lixiviant, such as in-situ, heap, vat, or agitated leaching.

BACKGROUND OF THE INVENTION

A cyanide process which employs cyanide as a complexing agent has been used exclusively for many years in, for example, hydrometallurgical recovery of gold from auriferous ores. However, the serious impacts of cyanide toxicity upon waste disposal and upon the environment have made it urgent to reconsider the process.

It has been proposed to use thiourea, sodium thiosulfate, or the like in place of cyanide as the gold complexing agent. These substitutes, however, make the treatment so much more costly that they have seldom come into practical use.

Chlorine was tried earlier, but its adoption was given up because of its strong corrosive attack and high treatment cost involved.

Lixiviating a gold-containing material with iodine to recover gold is well known in the art. For example, processes for leaching gold from a gold-containing material with an iodine/iodide lixiviant or for recovering gold from a gold-iodine solution (commonly known as a pregnant lixiviant) directly obtained by leaching are described in U.S. Pat. Nos. 2,304,823, 3,957,505, and 4,557,759. Those processes entail the loss of expensive iodine and are not economically warranted.

A process for efficiently achieving both electrolytic recovery of gold and regeneration of iodine from an aqueous solution containing elemental iodine and iodide ions, taking advantage of the oxidizing power of iodine and the gold-complexing action of iodide ion has been established. Refer to PCT Patent Application Publication No. 502358/1988 (International Publication No. W087/03623) for details.

The process (hereinafter called the "iodine process") may be defined as: "A process for recovering gold by electrolysis from a pregnant, gold-bearing iodine lixiviant in which gold has been leached from a gold-containing material with an iodine/iodide lixiviant, while, at the same time, oxidizing part of the iodide ions in the lixiviant to regenerate iodine and recycle the lixiviant to the gold-leaching step."

To be more specific, the process is illustrated as comprising the steps of introducing the gold-bearing iodine lixiviant into the cathode compartment of an electrolytic cell, where gold is electrodeposited on the cathode electrode, reducing iodine in the lixiviant substantially to iodide, and conducting the effluent solution from the cathode compartment into the anode compartment, where the iodide ions are oxidized for regeneration to elemental iodine.

The iodine process is attracting attention as an excellent method for gold recovery to replace the cyanide process and offers the following advantages:

(1) It has fewer deleterious effects upon the environment.
(2) Iodine in the lixiviant solution is stable in the form of a complex salt ($I_3^-$), and therefore, iodine loss during handling is minimized and the iodine concentration is easy to control.
(3) The resulting gold complex salt is highly stable.
(4) Regeneration of iodine permits recycling of the spent lixiviant solution, realizing low cost operation.

While the leaching process is, of course, essential for such gold recovery techniques, a washing system for the leach residue must also be considered. After the leaching of a gold-containing material and after the removal of the pregnant lixiviant, the leach residue usually contains about 20% of the iodine originally fed and a concomitantly formed gold-iodine complex. If the iodine-aided gold recovery process is to be commercially practicable, iodine and the gold-iodine complex in the residue should be recovered completely without any waste.

Recovery of gold from the gold-iodine solution (pregnant lixiviant) that results directly from the leaching of a gold-containing material is accomplished in a variety of ways. For example, as described in the aforementioned patents, a precipitate is formed using a reducing agent and then gold is recovered physically by filtration of the precipitate. Alternatively, gold is directly recovered electrochemically by an electrolytic process. However, the gold and iodine concentrations in the gold-iodine solution obtained by washing the gold-containing leach residue (this gold-iodine solution is generally called as a barren solution) are usually about one-tenth or less of the values of the pregnant lixiviant. Therefore, if some concentration operation is not done beforehand, gold cannot be efficiently recovered with the use of prior art processes.

As a means to concentrate gold from a gold-containing solution, the use of an ion-exchange resin has been proposed. For example, Gienn R. Palmer: "Ion-Exchange Research in Precious Metals Recovery," a publication published by the U.S. Bureau of Mines, deals with the recovery of a gold-cyanogen complex adsorbed on a strongly basic anion-exchange resin as associated with the cyanide process.

Previously, a removal of a gold complex by elution from a strongly basic anion-exchange resin on which it is adsorbed has involved considerable difficulty. One approach to recover gold from the complex is to allow the ion-exchange resin to adsorb gold up to saturation and bake the gold-adsorbing resin. The process, which involves incineration of the expensive ion-exchange resin, is economically disadvantaged. In addition, it poses a pollution problem due to the noxious gas evolution upon incineration. As an alternative, the adoption of a weakly basic (weak-base) anion-exchange resin which makes the elution easier has been proposed. In this case, it is necessary to add hydrogen ions to the weakly basic anion-exchange resin in advance to adsorb the gold complex on the resin. This limits the applicable pH range and the resin has a small adsorption capacity compared to the strongly basic anion-exchange resin. Another method of recovering gold with a chelate resin has been introduced. Disadvantages associated with the method are that the chelate resin, with a stronger adsorptive power than the strongly basic anion-exchange resin, makes elution practically impossible and that the resin itself is considerably more costly than ordinary ion-exchange resins.

The reference cited above describes the elution of a gold-cyanogen complex adsorbed on a strongly basic anion-exchange resin by the use of NaClO, NaCl, and NaOH. The reference process, thus directed to the elution of a cyanogen system, furnishes little information directed to the process of concern herein, which handles the iodine system.

To utilize a strongly basic anion-exchange resin that has a great capacity for adsorbing a gold-iodine complex in an iodine-aided gold recovery process, a novel method of eluting the gold-iodine complex effectively from the resin must be developed. This is particularly true when a lean gold-iodine complex is to be adsorbed for recovery from washings that contain the complex as a result of leaching of gold from a gold-containing material with the aid of iodine.

SUMMARY OF THE INVENTION

This invention is predicated upon the discovery that, while a strongly basic (strong-base) anion-exchange resin that has a great capacity for adsorbing a gold-iodine complex is being used in the adsorption and recovery of the complex, gold can be easily eluted from the ion-exchange resin by incorporating into the process a step of treating the gold-iodine complex in advance on the resin to a state in which it can be more easily eluted before the introduction of an elutant. The discovery has led to the successful development of a practical elution process. For the first step, it has been found desirable to treat the gold-iodine complex with sulfuric acid and sodium nitrite. As for the elutant, sodium sulfite is suitable.

On the basis of the above discovery, the present invention provides:

(1) A process for eluting a gold-iodine complex from ion-exchange resins characterized by adding sulfuric acid and sodium nitrite to a gold-iodine complex adsorbed on a strongly basic anion-exchange resin, and thereafter, adding sodium sulfite thereto as an elutant; and (2) An elution process for gold-iodine complex from ion-exchange resins characterized by adding sulfuric acid and sodium nitrite to a gold-iodine complex adsorbed on a strongly basic anion-exchange resin, said complex being adsorbed beforehand by passage through the ion-exchange resin of washings that have resulted from the washing of the residue of a gold-containing material leached with an iodine/iodide lixiviant, and thereafter, adding sodium sulfite thereto as an elutant.

DETAILED DESCRIPTION OF THE INVENTION

Figure 1:
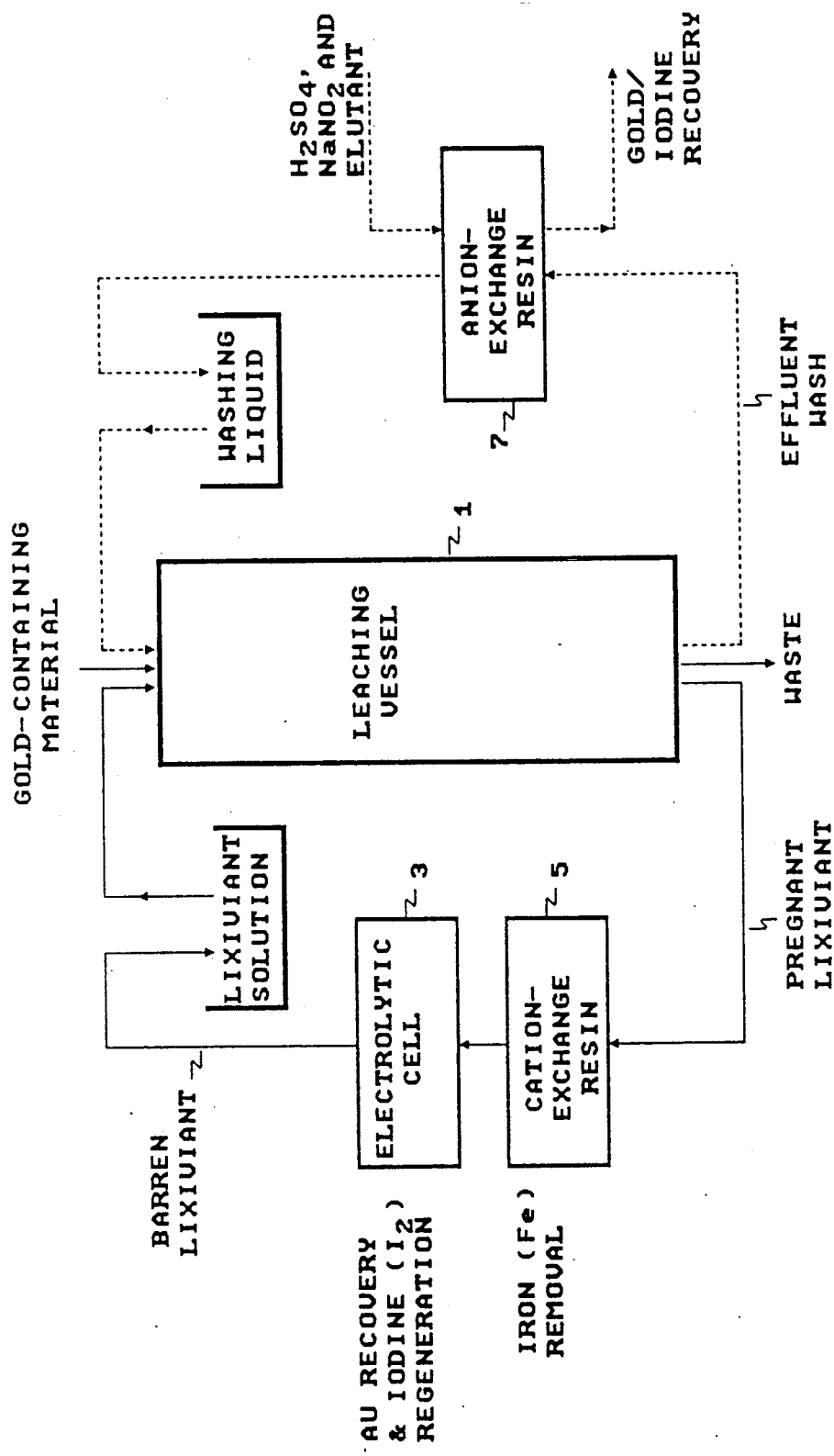
FIG. 1 is a flow sheet of a process for practicing the iodine process incorporating the present invention.

This invention is basically applicable to all processes that require elution of a gold-iodine complex adsorbed on a strongly basic anion-exchange resin. For example, it applies to the recovery of gold from gold-containing lixiviant solutions. More particularly, it is suited for the recovery of gold from a gold-barren (e.g., 1 ppm or less gold) lixiviant solution. Further, the process may be used in recovering gold from washings that result from gold-handling processes.

Typical of the strongly basic (strong-base) anion-exchange resin as used in this invention is one having a quaternary ammonium salt structure as the exchangeable groups. This resin is commonly produced by catalytic chloromethylation and amination of a styrenedivinylbenzene co-polymer. Depending on the type of amine used, various ion-exchange resins can be formed. For example, those quaternarized with a tertiary amine such as trimethylamine are well known as type I and those quaternarized with dimethyl ethanolamine as type II. A number of these products are commercially available. Examples of known products include SA series, such as "DIAION" (trade designation) SA-10A and SA-20A, marketed by Mitsubishi Kasei Corp. and IRA series, such as "AMBERLITE" (trade designation) IRA-400 and IRA-410, by Tokyo Organic Chemical Ind., Ltd.

This invention is especially useful for the elution of a gold-iodine complex from a strongly basic anion-exchange resin on which it is adsorbed beforehand by passage through the ion-exchange resin of washings that have resulted from the washing of the residue of a gold-containing material leached with an iodine/iodide lixiviant.

This invention is particularly well suited for use, in combination with the iodine process, to a system for washing the residue that has resulted from the leaching of a gold-containing material. The invention will, therefore, be illustrated below as incorporated in the iodine process for reference.

FIG. 1 is a flow sheet of a process for practicing the iodine process embodying the present invention. In a leaching vessel holding a gold-containing material, gold is leached with an iodine/iodide lixiviant solution. From the resulting pregnant, gold-bearing iodine lixiviant, gold is recovered by electrolytic cell 3. Concurrently, a portion of iodide ions in the pregnant, gold-bearing iodine lixiviant is oxidized to regenerate iodine so that the solution is recycled as the lixiviant for gold leaching.

Gold-bearing materials normally contain substances other than gold which are leachable with iodine. For example, in auriferous ores, ferrous minerals such as pyrite and pyrrhotite usually occur. Even in scraps containing precious metals, the presence of iron, copper, and the like, is common. When such a gold-containing material is leached with an iodine lixiviant solution, the proportion of the resulting heavy metal ions to the gold ions in the pregnant lixiviant is generally about equivalent to or several figures larger than the latter.

The pregnant lixiviant, if subjected to simultaneous electrolytic recovery of gold and iodine regeneration for reuse of the lixiviant without prior purification, would present the following problems:

(a) At the cathode of the electrolytic cell, electrolysis of a portion of water takes place, making the cathode solution alkaline. Consequently, hydroxides of heavy metals other than gold are formed in the cathode compartment, and they interfere with the gold deposition onto the cathode.

(b) When the regenerated electrolyte, still containing the heavy metals, is reused in leaching gold from a fresh feed of gold-containing material, a substance unleachable with the iodine lixiviant solution tends to form on the surface of gold in the gold-containing material. If this occurs, the leaching of gold could be hampered (passivation of the gold surface).

For wider use of the iodine process, the solution of these problems is imperative. In particular, it appears that there will be a growing requirement in the future for broadening the range of gold-containing materials to which gold recovery by the iodine process is applicable. To meet the requirement, it is important to eliminate the troubles that would arise from the presence of iron and other heavy metals.

To attain this end, the pregnant lixiviant is passed, prior to the electrolysis, through, for example, a resin column 5 where it comes in contact with a styrenic, strongly acidic cation-exchange resin. Thus, purification of the gold-containing iodine lixiviant solution is carried out by allowing gold and iodine to pass while heavy metals other than gold, such as iron, are selectively adsorbed.

The righthand loop indicates the purification system for the leach residue associated with the present invention. After the leaching of a gold-containing material and the removal of the pregnant lixiviant, the leach residue usually contains about 20% of the originally fed iodine and a concomitantly formed gold-iodine complex. Purification is effected to make the iodine-aided gold recovery process commercially practicable. According to the present invention, washings resulting from the washing of the gold-containing material leaching residue are passed through a resin column 7 packed with a strongly basic anion-exchange resin to cause the resin to adsorb the gold-iodine complex. The complex thus adsorbed on the resin is treated by adding sulfuric acid and sodium nitrite, and then eluted by the addition of sodium sulfite as an elutant.

Iodine is capable of ionizing gold and complexing the ionized gold. When gold is leached using an aqueous solution of iodine and iodide ions, the dissolution of gold is presumed to proceed in accordance with the following equations:

$$I^- + I_2 = I_3^- \tag{1}$$

$$2Au + I_3^- + I^- = 2AuI_2^-, \tag{2}$$

$$2Au + 3I_3^- = 2AuI_4^- + I^- \tag{3}$$

The iodide used is a water-soluble iodide in the form of an alkali metal salt of iodine typified by sodium iodide or potassium iodide.

The total iodine concentration in the lixiviant solution is adjusted to the range of 1 to 20 grams/liter (g/l), preferably to the range of 2 to 5 g/l. The ratio by weight of the reduced iodine ($I^-$) to oxidized iodine ($I_2$) is desired to range from 10:1 to 1:10. A ratio around 2:1 appears to be more economically desirable.

The term "gold-containing material" as used herein refers generically to any of various gold-bearing ores and metallic materials. The ores include any auriferous ores such as silicate ores and sulfidic ores and concentrates. The metallic materials include scraps of electronic devices and appliances and wastes and residues of refinery. Such a material is crushed and fed in granular form to a lixiviation vessel. To shorten the leaching time and increase the leaching rate, the granular material may be agglomerated.

Leaching in a variety of ways comes within the scope of the invention. For example, vat leachings uses a leaching vessel (vat) in which a lixiviant from a feeder installed above the vessel is uniformly sprinkled over, and into contact with, a bed of granulated ore laid on a perforated filter plate. Agitated leaching involves agitation by impellers or the like. Heap leaching consists of sprinkling a lixiviant solution over a heap of ores in open-air storage. In-place leaching comprises forming artificial fissures in an ore body and sprinkling a lixiviant over it through the fissures. The leaching bed in FIG. 1 is merely shown by way of example.

The electrolytic cell 3 is partitioned, for example, by a cation-exchange membrane into cathode and anode compartments. The process with this cell comprises introducing a gold-bearing iodine lixiviant into the cathode compartment of the electrolytic cell 3, where gold is electrodeposited on a cathode of steel while, at the same time, iodine in the pregnant lixiviant is reduced substantially to iodide. The effluent is then conducted from the cathode compartment into the anode compartment equipped with, for example, an anode of graphite where iodide ions are oxidized to regenerate iodine.

For the purification of the lixiviant prior to the electrolysis, the adoption of the process set forth in the patent application filed by the present applicant on the same date as this patent application is recommended. The co-pending application describes a purification process for a pregnant, gold-bearing iodine lixiviant which involves bringing the pregnant lixiviant into contact with a styrenic, strongly acidic (strong-acid) cation-exchange resin, thereby selectively adsorbing and removing the heavy metals such as iron from the lixiviant while allowing gold and iodine to pass through the resin.

Turning now to the washing system according to the present invention, some explanation of procedure will be made.

A sulfuric acid solution and a sodium nitrite solution are added, in succession or simultaneously, to an anion-exchange resin on which iodine and a gold-iodine complex are adsorbed, effecting the oxidation of iodide to iodine ($I_2$). The concentrations of the sulfuric acid solution and sodium nitrite solution to be added are in the range of 5 to 25 percent by weight each, preferably 10 to 15 percent by weight each. If the concentration of either solution is less than 5 percent by weight, the consequent increases in the amount of solution results in reduced efficiency of the oxidation reaction due to overloading. On the other hand, the upper limit of 25 percent by weight each is chosen, taking the solubilities of these reagents under the operating conditions into account. The amounts of the solutions to be added vary with the amount of the gold-iodine complex adsorbed on the anion-exchange resin. A rule of thumb to be taken into account is the fact that when the amounts of the sulfuric acid and sodium nitrite solutions added are appropriate, elemental iodine ($I_2$) is formed on the anion exchange resin and is immediately adsorbed by the resin which turns brownish. This may be utilized as a visual point of identification. Elemental iodine is formed immediately by oxidation of iodide ion upon the addition of the two reagents, but the mechanism is unclear.

The addition of a sodium sulfite solution as an elutant to the gold-iodine complex, which has been treated as above on the ion-exchange resin, makes possible the easy elution of gold-iodine complex.

The concentration of the sodium sulfite to be added ranges from 3 to 25 percent by weight, preferably about 5 percent by weight. If the sodium sulfite concentration is less than 3 percent by weight, the elution efficiency eluted at a high elution rate of 98.6%. The results are summarized in Table 1.

TABLE 1

| Operation | Run | Kind of Adsorbent or Elutant | Quantity of Solution (cc) | Gold Concentration (ppm) | Quantity of Gold (mg) | Gold Elution Rate % | Cumulative Total |
|---|---|---|---|---|---|---|---|
| Adsorption | 1 | Initial Adsorbent Solution | 1.000 | 1.0 | 1.000 | | 100.0 |
| Pretreating | 1 | 10% $H_2SO_4$ | 10 | 0.0 | 0.000 | 0.0 | 0.0 |
| | 2 | 10% $NaNO_2$ | 10 | 0.0 | 0.000 | 0.0 | 0.0 |
| Elution | 1 | 20% $Na_2SO_3$ | 20 | 24.6 | 0.492 | 49.2 | 49.2 |
| | 2 | 20% $Na_2SO_3$ | 20 | 14.6 | 0.292 | 29.2 | 78.4 |
| | 3 | 20% $Na_2SO_3$ | 20 | 4.7 | 0.094 | 9.4 | 87.8 |
| | 4 | 20% $Na_2SO_3$ | 20 | 2.0 | 0.040 | 4.0 | 91.8 |
| | 5 | 20% $Na_2SO_3$ | 20 | 1.9 | 0.038 | 3.8 | 95.6 |
| | 6 | 20% $Na_2SO_3$ | 20 | 1.2 | 0.024 | 2.4 | 98.0 |
| | 7 | 20% $Na_2SO_3$ | 20 | 0.3 | 0.006 | 0.6 | 98.6 |
| | | Total (mean) | 140 | 7.0 | 0.986 | 98.6 | 98.6 | drops. On the other hand, consideration of its solubility sets the upper limit of 25 percent by weight. The amount of the sodium sulfite solution to be added may be just enough to attain a desired gold elution rate.

The advantageous effects of the invention will become obvious from the following description of an example thereof.

EXAMPLES

A solution (1000 cc) containing 0.76 g iodine per liter and 1.00 ppm gold was passed, at a rate of 10 cc per minute, through 10 cc of a strongly basic anion-exchange resin manufactured by Mitsubishi Kasei Corp. under the trade designation "DIAION SA-10A" (a styrenic, strongly basic anion-exchange resin of the gel type (type I) and of the Cl form). Neither iodine nor gold was detected from the solution that passed through the ion-exchange resin. This fact proved the excellent properties of the strongly basic anion-exchange resin used in elution, which rendered it possible to recover completely both gold and iodine from the solution containing a low concentration of gold and iodine.

Thereafter, 10 cc of a 10 weight percent sulfuric acid solution was added followed by adding 10 cc of a 10 weight percent sodium nitrite solution. Browning of the ion-exchange resin upon passage of the two solutions was observed. No trace of gold or iodine was detected in both solutions that passed through the ion-exchange resin.

After this, a total of 140 cc of a 20 weight percent sodium sulfite solution was added as an elutant, in 20 cc portions, to the ion-exchange resin. Gold was rapidly

COMPARATIVE EXAMPLE 1

An example in which elution tests were conducted without incorporating the first step according to the present invention will be described below as a comparative example.

Ten liters of the same "DIAION SA-10A" of Mitsubishi Kasei Corp. as used in Example was employed as a strongly basic anion-exchange resin. Washings (1880 liters) containing 0.86 g iodine per liter and 0.40 ppm gold were passed, at a rate of 400 cc per minute, through the resin. Neither iodine nor gold was detected from the treated solution that passed through the resin. Elution was then carried out using a 20 weight percent sodium sulfite solution and using a 20 weight percent common salt solution as elutants. Table 2 shows the results.

TABLE 2

| No. | Kind of Elutant | Quantity of Solution (l) | I Concentrate (g/l) | I Weight (g) | I Recovery Rate (%) | Au Concentration (mg/l) | Au Weight (g) | Au Recovery Rate (%) |
|---|---|---|---|---|---|---|---|---|
| 1 | $Na_2SO_3$ | 19.12 | 14.90 | 284.9 | 17.5 | 0.80 | 0.0153 | 2.0 |
| 2 | $Na_2SO_3$ | 9.96 | 58.24 | 580.1 | 35.7 | 0.05 | 0.0005 | 0.1 |
| 3 | NaCl | 20.72 | 20.23 | 419.2 | 25.8 | 0.74 | 0.0153 | 2.0 |
| 4 | NaCl | 19.66 | 6.53 | 128.4 | 7.9 | 0.36 | 0.0071 | 0.9 |
| 5 | NaCl | 15.86 | 4.66 | 73.9 | 4.5 | 0.12 | 0.0019 | 0.3 |
| 6 | NaCl | 16.48 | 2.54 | 41.8 | 2.6 | 0.08 | 0.0013 | 0.2 |
| 7 | NaCl | 15.74 | 1.02 | 16.0 | 1.0 | 0.05 | 0.0008 | 0.1 |
| 8 | NaCl | 16.12 | 0.44 | 7.1 | 0.4 | 0 | 0 | 0 |
| 9 | NaCl | 15.88 | 0.22 | 3.5 | 0.2 | 0 | 0 | 0 |
| 10 | NaCl | 9.74 | 0.12 | 1.2 | 0.1 | 0 | 0 | 0 |
| | Total (mean) | 159.28 | 9.77 | 1556.1 | 95.7 | 0.26 | 0.0422 | 5.6 |

As can be seen from the table, the elution process that did not incorporate the step of treatment on the resin eluted only not more than 6% of gold while eluting at least about 95% iodine.

COMPARATIVE EXAMPLE 2

The literature cited under the prior art describes that a gold-cyanogen complex (not a gold-iodine complex) adsorbed beforehand by a strongly basic anion-exchange resin can be eluted using a mixture of NaClO, NaCl and NaOH. Accordingly, a test was conducted to elute a gold-iodine complex solidly adsorbed on a strongly basic anion-exchange resin by the use of a mixed solution consisting of 0.75% NaClO, 150 g/l NaCl, and 5 g/l NaOH. Gold was not eluted out.

As stated hereinbefore, the elution process established in accordance with the invention, renders it easy to perform the elution of a gold-iodine complex from a strongly basic anion-exchange resin on which it is adsorbed, in spite of the fact that such elution has been considered difficult hitherto. In particular, it opens up the possibility of concentrating lean gold-iodine complexes and making the iodine-aided gold recovery process economically feasible. It is believed that this invention contributes, above all, to the commercial acceptance of the gold recovery process using iodine, especially of the iodine process.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

I claim:

1. An elution process for gold-iodine complex from ion-exchange resins comprising the steps of adsorbing a gold-iodine complex on a strongly basic anion-exchange resin, adding sulfuric acid and sodium nitrite to said gold-iodine complex adsorbed on said strongly basic anion-exchange resin, and thereafter adding sodium sulfite thereto as an eluant.

2. An elution process for gold-iodine complex from ion-exchange resins comprising the steps of adsorbing a gold-iodine complex on a strongly basic anion-exchange resin, adding sulfuric acid and sodium nitrite to said gold-iodine complex adsorbed on said strongly basic anion-exchange resin, said complex being adsorbed by passage through the ion-exchange resin of washings resulting from the washing of the residue of a gold-containing material leached with an iodine/iodide lixiviant, and thereafter adding sodium sulfite thereto as an eluant.

3. An elution process according to claim 1 or claim 2 wherein the concentrations of the sulfuric acid and sodium nitrite are in the range of 5 to 25 percent by weight each.

4. An elution process according to claim 1 or claim 2 wherein the concentration of the sodium sulfite ranges from 3 to 25 percent by weight.

5. An elution process according to claim 2, wherein said gold-containing material is selected from the group consisting of gold-bearing ores, scraps of electronic devices and appliances, and wastes and residues of refinery.

6. An elution process according to claim 5, wherein said gold-bearing ores are selected from the group consisting of silicate ores, sulfidic ores and concentrates thereof.

7. An elution process according to claim 2, wherein said iodide is a water-soluble iodide in the form of an alkali metal salt of iodine.

8. An elution process according to claim 2, wherein total iodine concentration in the liviviant solution is adjusted to the range of 1-20 g/l.

9. A process for eluting a gold-iodine complex from an ion-exchange resin, comprising the steps of:
   a) contacting said resin with a first solution capable of oxidizing iodide to iodine; and
   b) eluting said gold-iodine complex from said resin with a second solution to recover gold therefrom.

10. A process as recited in claim 9, wherein said first solution comprises sulfuric acid and sodium nitrite.

11. A process as recited in claim 9, wherein said second solution comprises sodium sulfite.

12. A process as recited in claim 9, wherein at least about 98% of the gold complexed on said resin is recovered by said eluting step.

13. A process for the recovery of gold from a gold-containing material, comprising the steps of:
   a) leaching said gold-bearing material with a lixiviant comprising iodine to form a gold-containing iodine lixiviant;
   b) recovering gold from said gold-containing iodine lixiviant;
   c) washing the leach residue from said leaching step to form a gold-containing washing solution;
   d) contacting said washing solution with an anion-exchange resin;
   e) contacting said resin with a solution capable of oxidizing iodide to iodine;
   f) contacting said resin with an elutant to elute gold from said resin.

14. A process as recited in claim 13, wherein said oxidizing solution comprises sodium nitrite and sulfuric acid.

15. A process as recited in claim 13, wherein said second solution comprises sodium sulfite.

* * * * *